United States Patent [19]
Ishibashi et al.

[11] Patent Number: 5,458,762
[45] Date of Patent: Oct. 17, 1995

[54] ELECTROLYZER AND METHOD OF OPERATING SAME

[75] Inventors: Tadaya Ishibashi, Suita; Masanori Sasaki, Okazaki; Hideto Obara; Hiroshi Kano, both of Uji, all of Japan

[73] Assignee: Unitika Ltd., Hyogo, Japan

[21] Appl. No.: 202,703

[22] Filed: Feb. 24, 1994

[30] Foreign Application Priority Data

Dec. 26, 1990 [JP] Japan .................................. 2-406447
Feb. 4, 1991 [JP] Japan .................................. 3-068648

[51] Int. Cl.⁶ .......................... B01D 61/42; C25D 7/00; C25B 7/00; C25F 7/00
[52] U.S. Cl. .................. 204/301; 204/182.3; 204/182.4; 204/182.5
[58] Field of Search ................. 204/301, 182.3, 204/182.4, 182.5, 182.6

[56] References Cited

U.S. PATENT DOCUMENTS

| | | | |
|---|---|---|---|
| 2,593,915 | 4/1952 | Pavelka | 204/301 |
| 2,739,938 | 3/1956 | Wiechers | 204/301 |
| 3,764,499 | 10/1973 | Okubo et al. | 204/182.4 X |
| 4,105,534 | 8/1978 | Beatty, III | 204/301 |
| 4,654,137 | 3/1987 | Vaugham | 204/301 |
| 4,810,344 | 3/1989 | Okazaki | 204/260 |
| 4,964,970 | 10/1990 | O'Hare | 204/301 |

FOREIGN PATENT DOCUMENTS 63-051990  3/1988  Japan .................................. 204/301

Primary Examiner—John Niebling
Assistant Examiner—John S. Starsiak, Jr.
Attorney, Agent, or Firm—Barnes, Kisselle, Raisch, Choate, Whittemore & Hulbert

[57] ABSTRACT

The present invention relates to an electrolyzer for treating an object liquid. A cylindrical anode plate is formed as an outer wall of said electrolyzer and a cylindrical cathode plate is coaxially arranged at a position close to an inner surface of said anode plate. An ion exchange membrane is coaxially arranged between both electrodes to form an isolating chamber for a selective electrophoretic separation and removal and a concentration. A liquid, which has been subjected to an aimed treatment in said isolating chamber, is uniformly flown out from a whole circumference through a circumferential passage provided in an upper portion of an electrode portion. Thus, anions, which have acted upon metal cations, are dissociated in said isolating chamber to selectively separate merely cations. In addition, an improvement of the anode brought into contact with said object liquid in durability, a simplification of electrode surfaces in repair and processing, a uniformation of a current density, a handling of the liquid under the conditions corresponding to an operating object of the electrolyzer and the like can be achieved.

1 Claim, 7 Drawing Sheets

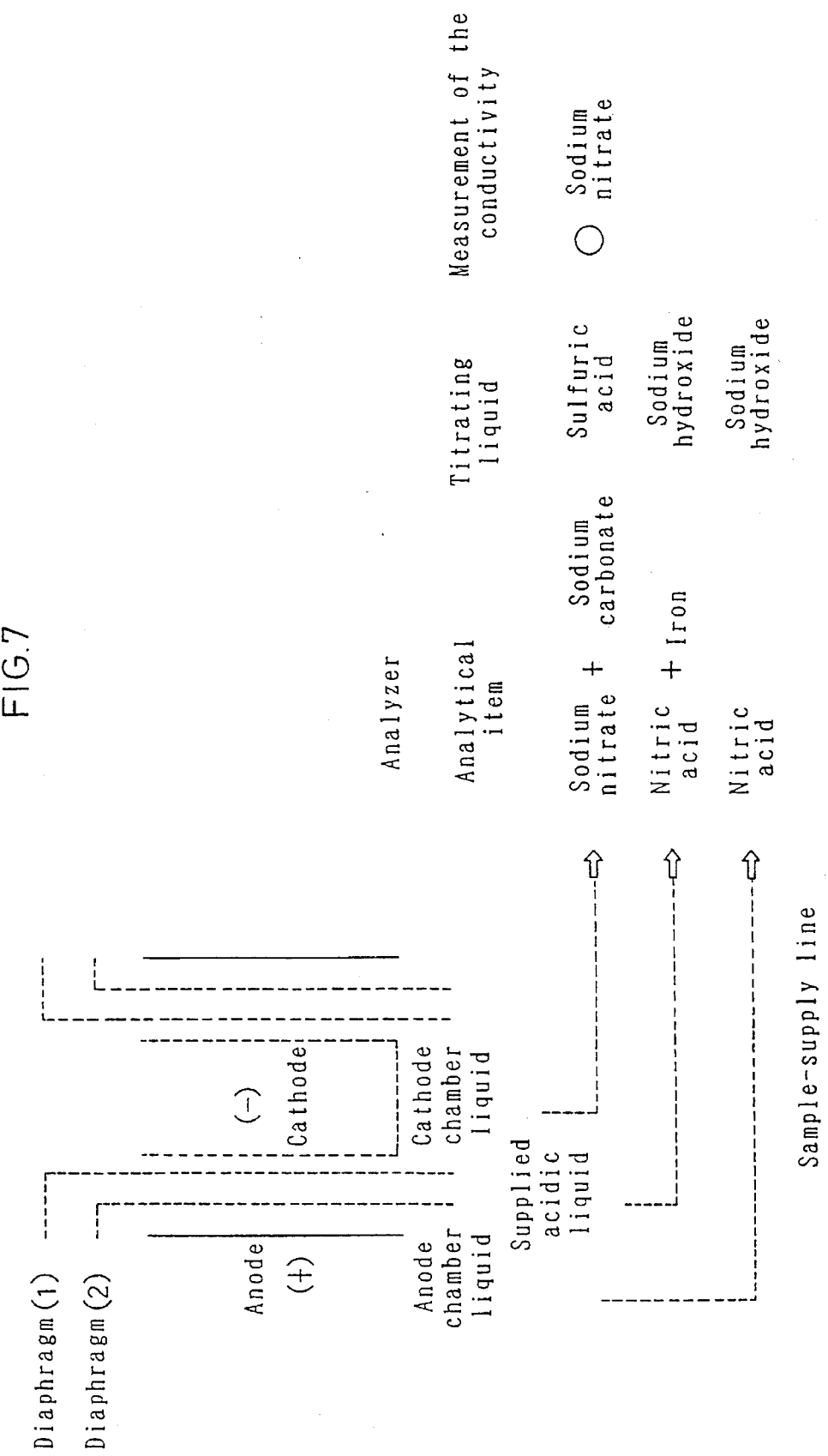

ELECTROLYZER AND METHOD OF OPERATING SAME

This application is a continuation of Ser. No. 07/811,612 filed Dec. 23, 1991, abandoned.

FIELD OF THE INVENTION

The present invention relates an electrolyzer and a method of operating the same, in particular to an electrolyzer for electrolyzing chargeable and dissociatable metallic cations dissolved in a liquid represented by a liquid composition, which has been used for a surface treatment of a metal, and a method of operating the same.

BACKGROUND OF THE INVENTION

The known electrolyzers of this type have adopted a construction that flat electrode plates are immersed in an electrolyzer so that both electrodes may be arranged in parallel to each other or a construction that both electrodes are formed in a cylindrical shape to be immersed in a cylindrical electrolyzer, as disclosed in Japanese Patent Application Laid-Open No. sho 61-241592 and Japanese Patent Application Laid-Open No. Sho 61-276986.

However, with such an electrode construction, a disadvantage has occurred in that an inner side opposite to a cathode in an anode surface can be charged to exhibit aimed characteristics by a processed article added in order to particularly improve a corrosion resistance of said anode surface but a complicated uneven charged condition is generated on a surface on the opposite side and thus an unnecessary measure for giving a corrosion resistance to a back side must be taken. In addition, a thermal expansion due to a heating of the anode frequently has led to a generation of a separation of a surface of a metal to be processed from an internal mother metal. In addition, it has been difficult to maintain a long-term operation at a high-charge and a necessary sectional area is required for an electric wire in order to avoid a heating in a supply of an increased electric current and thus said electric wire is thickened. Furthermore, an operating voltage is greatly influenced by a distance between the anode and the cathode and said voltage is reduced with a reduction of said distance so that it is preferable that the distance between the anode and the cathode is reduced as far as possible. However, it has been difficult to mutually meet the desired conditions in these known arts.

In general, in an electrolyzing operation, all of an electric current charged in the respective electrodes is not used for a movement of an aimed substance but is used for a decomposition of water on electrode surfaces proportional to a concentration of a free acid in the liquid in an increased ratio. In addition, said electrode surfaces are covered with bubbles of gaseous ingredients generated by this decomposition and an insulated bubble layer is formed in a radical case and thus the aimed electric current can not pass in many cases. Accordingly, an effective measure has been sought.

Furthermore, in general, the respective electrodes have been charged with a direct current always in an appointed direction without changing a charging polarity always.

However, in the case where an electric current having such the wave form is charged, said gaseous bubbles generated from a film surface are still more grown to be burst up, whereby giving a great shock to the electrode surfaces when burst up, oxidized particles of the metal being stuck in particular to the electrode surfaces. Thus, in the case where the electrodes have a construction that the electrode surfaces are protected, an influence by said construction is increased and a current density can not but being suppressed to one considerably lower than the aimed current density in order to reduce said influence in many cases.

Accordingly, it is a subject in this field how to make an effective device for maintaining a useful life time of the electrodes at an electric current charged of a value close to the usable current density of the electrodes.

In addition, since a coexisting of many kinds of ion in an acidic bath can not be avoided, results by an electrolytic separating operation in a liquid containing these kinds of ion are greatly different from those obtained by an operation in a liquid having a simple composition. In particular, in the case where an ion exchange resin exhibiting a high selectivity of passing kinds of ion is used, it has been thought that an almost perfect separation is possible but actually no satisfactory result has been obtained in the real industrial applied fields.

DISCLOSURE OF THE INVENTION

It is an object of the present invention to provide an electrolyzer having a highly durable anode plate. It is another object of the present invention to provide an electrolyzer in which, in order to enable the operators to easily repair the electrode surfaces and easily obtain an endless uniformity of current density in the direction of length, an anode is formed in a cylindrical shape and also a cathode as a counter electrode is formed in a cylindrical shape and arranged on an inner surface of said anode. In addition, in order to add a function as an electrolyzer, a supply liquid is adapted to be treated under the conditions meeting an operating object of said electrolyzer by taking how to install a diaphragm arranged between both electrodes and a supply method of said .supply liquid into consideration and adding utilities above and below electrode portions.

Furthermore, the direction of the polarity of the electric current charged on the electrode surfaces is not always set so as to be constant for the respective electrodes but the polarity is periodically changed within an appointed remarkably short time. Thus, the gaseous ingredient bubbles generated from the respective electrode surfaces are not generated in the form of large bubble at specified positions as in the conventional electrolyzer but they are generated in the form of very small bubble uniformly all over the surface of the electrode. Accordingly, a harmful effect due to a coverage of the electrode surface with the gaseous bubbles and a harmful effect due to a turbulence of a flow of the liquid to be treated flowing between the electrodes are eliminated.

It has been confirmed that cation-dissociated metallicions conducting an electrophoresis into a cathode chamber accompany halogen ions in a quantity of 0.4 to 0.6 electrochemical equivalents based on 1 electrochemical equivalent thereof depending upon a composition of an acid bath to be subjected to an electrolytic separating operation, in particular in case of a liquid simultaneously containing halogen compounds and metallic ions apt to easily form strong coordinate bonds with said halogen compounds.

In this case, it was unable to confirm that even though various kinds of cation-selective ion exchange resin membrane were applied as the partition diaphragms in the electrolytic operation, a ratio of a concentration of the accompanied metallic ions to that of said halogen ions was fluctuated but it was possible to reduce said concentration of the halogen ions to an extent out of the question.

Furthermore, as to these phenomena, it was found that of halogens, in particular a sodium salt of fluorine ion had a solubility, which was not high, and it was soon accumulated to an extent of said solubility, which came into question, or more even after a short operating time of the electrolyzer.

In the case where a continuous operation is carried out under such the phenomena, a measure for continuously extracting halides accumulated to control so that their concentration may not amount to a value of a limit or more is required.

In addition, in the operation for the acidic bath composition, a loss of components constituting the bath is increased because fractions adhered to products are carried out during a washing operation, so that an effective method of recovering said components contained in washings and a processing operation for turning the recovered salt solution into a solution having a composition capable of being used in a pickling tank again are required. On the other hand, even though it is tried to separate the metallic cations from the liquid system in the form of insoluble substances, a neutralizing agent is selected with a neutralization of a large quantity of coexisting acid radical as a center, so that for example in the case where a neutralizing-cohering operation is carried out by the use of lime and the metallic components are separated from the liquid system in the form of insoluble substances, iron fractions as the metallic component are separated with simultaneously adsorbing halides strongly coordinated thereto in the solution thereon and thus a problem occurs in that it is required to dispose the separated substances again. In order to heighten a reusability of the separated metal, it is required to adopt a method capable of separating such halogen compounds apart from the metallic components as far as possible.

Besides, it is required to supply the quantity of electric current calculated on the basis of the aimed separating operation by means of common power source equipments few as far as possible. In addition, the electrolytic operation is continuous and the fluctuation of electrolytes supplied in concentration leads to a difference in a cost of electric power required for transferring the same quantity of the same one substances to be separated depending upon circumstances and thus the similar work can not be expected, whereby it is difficult to control under the stabilized efficiency, so that it is required also to effectively maintain the operation control.

The concrete construction of the present invention is as follows:

(1) It is an object of the present invention to heighten the functions of dissociating ions and separating the chargeable substances. To this end, it is required to give a function of uniformly sending the liquid selected depending upon the treating object—separated within the isolated chamber, whereby operating by the operating voltage as little as possible. To this requirement, it is advantageous in processability that the electrodes for applying the voltage are cylindrically formed and the desired functions are added above and below the electrodes. In addition, this is apt to meet the required various kinds of condition.

(2) Accordingly, the respective electrodes are cylindrically formed and the anode structure is used as the partition wall of the electrolyzer to bring the outer side of the anode into direct contact with the air, whereby making the cooling of the electrode surface by the air possible and thus making the direct dispersed supply of the voltage to the surface of the partition wall possible, the applied voltage spots being reduced as far as possible to uniformly charge the front surface of the electrode, whereby preventing a trouble resulting from the separation of the processed electrode surface layer from the mother metal of the electrode by the heating within the electrode surface, and the charged potential and the current density on the surface, where the electrode is brought into contact with the liquid, being uniformed to increase the useful life time of the electrode.

(3) The electrode of the cathode is formed in the flat and smooth cylindrical shape close to the surface of the anode and small holes are uniformly dispersed all over the section of the electrolyzer to set the opening coefficient at 40% or less, thereby making the bubbles generated on the electrode surface easily separatable from the electrode surface. And, at the same time, the liquid within the cylindrical cathode surface and the liquid on the cathode surface close to the anode are easily transferred. In addition, in order to attach an electrically conductive bar to the electrode surface so that the applied electric current may be uniformly supplied all over the electrode surface and make an increase of the contacting area of this electrically conductive bar with the cathode surface easy, the flat and smooth structure is given to the electrode surface and the construction that the electrically conductive bar is taken out upward under the vertical condition is given to make the uniform application of the voltage all over the surface in the same manner as in the anode.

(4) In addition, in order to hold these electrodes, in particular to fix the anode, whereby supplying the anode chamber and the cathode chamber with the liquid and discharging the liquid from the cathode chamber, an auxiliary structure having such functions is added.

(5) The electric current having for example the pulseshaped wave form and the triangular wave form is applied to the respective electrode surfaces and the polarity of the electric current applied is divided for an appointed time width. A ratio of a time during when the polarity applied to the anode is maintained to be anodic relatively to the cathode is adapted to be 60 to 99.9% while a ratio of a time during when the polarity applied to the anode is maintained to be cathodic relatively to the cathode is adapted to be 1 to 30%. As to a time zone during when the polarity applied is maintained, a time during when the charge applied to the anode is anodic relatively to the charge applied to the cathode is 10 ms to 1,000 min and the polarity is inverted for a remaining time of 1 ms to 10 min. And, this pattern is successively reversed to invert the electrode to be charged. The distribution of these charging times is judged by measuring a time during when the wave form appearing on the oscillograph is anodic and that during when the wave form appearing on the oscillograph is cathodic.

(6) By adopting this charge-applying method, compounds having a tendency to deposit on both electrode surfaces can be dissolved and eluted. Thus, not only the characteristics to be given to the electrolytic electrode can be maintained but also the problems occurring on the diaphragm surface depending upon the charged condition of the surface of the partition diaphragm can be solved. In addition, since the depositing condition on the electrode surfaces is different depending upon the kind and the mixed condition of the metallic ions coexisting in the object solution, the charging times are distributed depending upon the depositing condition. Furthermore, the bubbles of the gaseous ingredients generated from the respective electrode surfaces are uniformed all over the electrode surfaces and minutely dispersed. Accordingly, the bubbles generated on the electrode surfaces are easily separated from the electrode surfaces and the flow of the liquid going from the lower part to the upper part of the electrode surfaces standing vertically is put upon the flow of the bubbles. Thus, the bubbles are not grown in the flow of the liquid and the formation of the insulating layer between the electrodes due to the growth of the bubbles can be prevented. The charge-applying method has not been investigated in the solution of such the problems and the present invention is very useful for the solution of these problems.

Accordingly, the electric current to be applied to the electrode surfaces can be applied at the aimed current density, the flow of the liquid in the narrow portion between the electrodes and the partition diaphragm receiving no resistance, and the liquid uniformly flowing at the stabilized liquid-sending pressure, so that the stabilized interval can be always maintained between the electrodes and the partition diaphragm without vibrating the partition diaphragm.

(7) It comes into question how to supply the electric current calculated to be necessary for the separating and removing operation of the aimed ionic charged substances coexisting in the supplied liquid by the reduced supply power-source capacity in the single electrolyzer having the above described functions. In order to solve this problem, at first, the electric current required in the separating operation is divided by an electric current obtained by multiplying the current density, which can be flown through a certain electrode area, by said area. And, the electrolyzers of a number obtained by this division are arranged in series, cathodic and anodic terminals of the respective electrolyzers being alternately connected, and said cathodic and anodic terminals of the first stage electrolyzer and the last stage electrolyzer being connected with the supply power source. Thus, the aimed total electric current can be obtained.

However, in order to achieve such the arrangement, a device for reducing the resistance between the electrodes in the electrolytic operation in the electrolyzer to reduce the supply voltage is required. Otherwise, a voltage drop is increased and thus it becomes difficult to maintain the aimed electric current due to the voltage drop in the last stage electrolyzer when the electrolyzers were connected in series.

Accordingly, it is required to take care so that the interval between the electrodes in the electrolyzer may be reduced to flow the electrically conductive liquid filled between the electrodes from the lower part to the upper part of the electrode plates in a high flow rate, thereby preventing the formation of the insulating layer by gases accumulated on the electrode surfaces. In addition, the circulating liquid brought into contact with the electrode surfaces must be supplied to the depressurized debubbling chamber every time when it comes out of the electrode chamber to remove also fine bubbles dispersed within the liquid so that no bubble may be stuck to the electrode surfaces and the partition diaphragm surface when the liquid is supplied to the electrode surfaces. Otherwise, the aimed operation can not be achieved.

For example, a problem occurs in that if the gases are stuck to the electrode surfaces in one electrolyzer to form the insulating layer, no electric current flows on the whole and thus the whole operations can not be achieved. Accordingly, in the electrolyzer having many factors changing the electric resistance between the electrodes during the operations in the respective electrolyzers, the electrolyzers can be arranged in series but the aimed stabilizing effect can not be expected in spite of the above described series arrangement.

In addition, in order to achieve such the operations, a control system capable of giving the supplied liquid the composition having the always stabilized conductivity must be provided. To such the end, the detecting analyzer for watching the composition of the liquid supplied to the electrolyzer and the equipment having the function of correcting the change of the composition must be provided.

(8) The fields, where the impurities contained in the supplied liquid are removed by the use of this electrolyzer, are very wide. Although it is different in characteristic of the object liquid, a difference between dominant substances and the substances to be removed in charge, the quantity of the substances to be removed and the like, in the case where the solution including the dissociation of coexisting ionic charges is dissolved, the reversely charged substances being placed in a different kind charged electric field, and the charges being separated by means of the cation partition diaphragm, this electrolyzer can be applied.

For example, in the case where ions, which are dissolved in (a) metallic acids (chromic acid, molybdenic acid, tungstenic acid and the like);

(b) inorganic acids (sulfuric acid, hydrochloric acid, hydrofluoric acid, nitric acid, phosphoric acid and the like); and (c) organic acids (oxalic acid, citric acid, butyric acid and the like)

to be turned into cations, exist in the liquid supplied to the anode chamber or the partition layer close to the anode chamber, these ions can be electrophoretically separated to the side of the cathode chamber.

BRIEF DESCRIPTION OF THE DRAWINGS

FIG. 7 is a diagram showing a sampling method according to the present invention.

DESCRIPTION OF THE PREFERRED EMBODIMENTS

EXAMPLE 1

A wire material of SUS 304 according to Japanese Industrial Standard is immersed in a pickling bath containing 0.8N (50.4 g/l) of free nitrate group, 0.5N (10 g/l) of free fluorate group and 0.5N (9.1 g/l) of iron salt group and having a temperature of 60° C. to be descaled.

An increasing rate of a concentration of iron salt group dissolved in said acidic bath by said descaling treatment was measured by the use of an analyzer with a result that it was 101 electro-chemical equivalents per one hour. At this time, a capacity of the bath was 15 m3. In order to remove metallic ingredients accumulated in this acidic bath, an electrolytic separation was carried out by the use of an electrolyzer.

A construction of a prepared electrolyzer is shown in FIG.

1.

Figure 1:
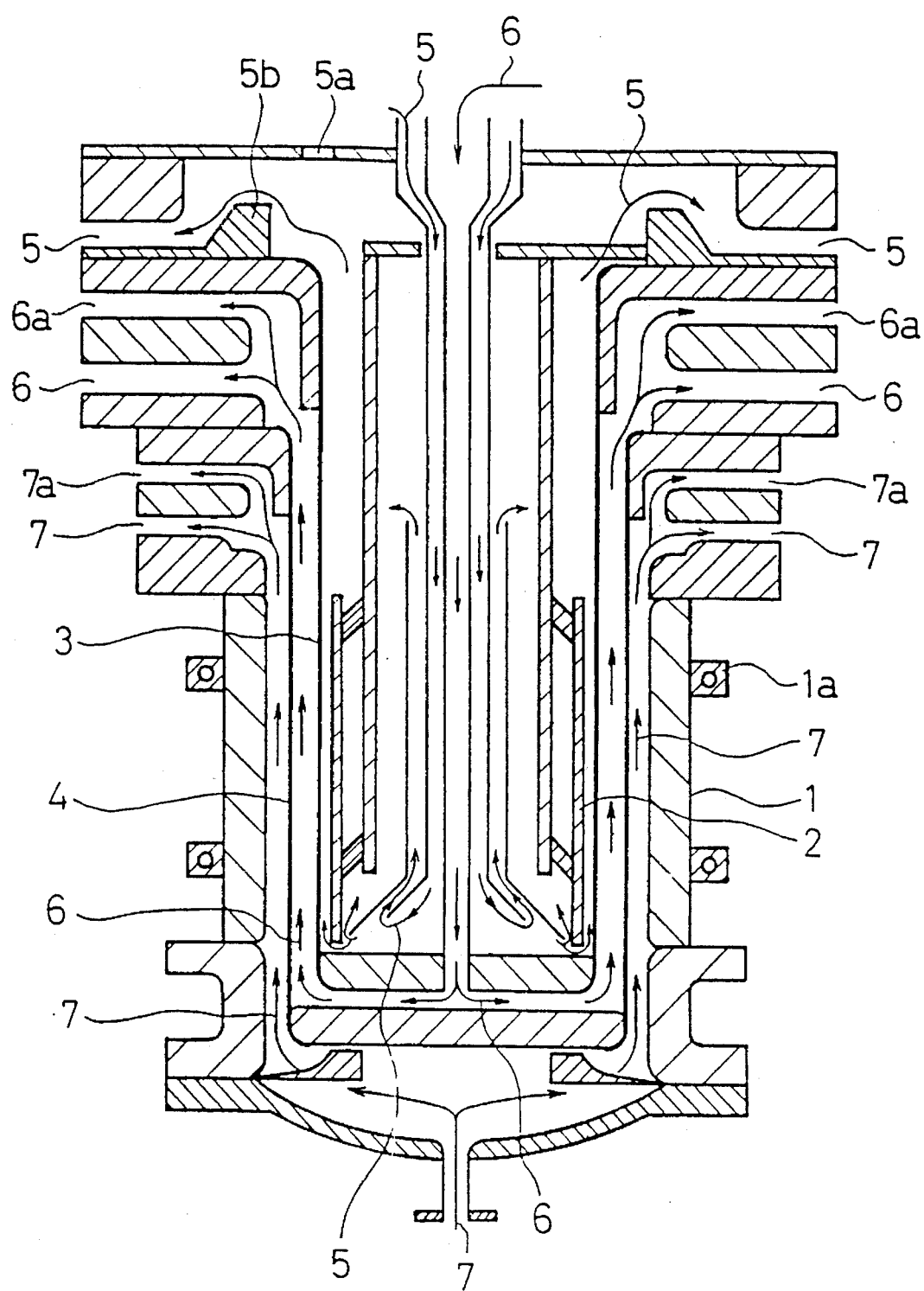
FIG. 1 is a sectional view showing an electrolyzer according to one preferred embodiment of the present invention.

Referring to FIG. 1, reference numeral 1 designates an anode formed of a titanium material having a wall-thickness of 6 mm, an inside diameter of 1,000 mm and a length of 1,000 mm. An inner surface of said cylindrical anode 1 is clad with a platinum foil of 8 µm thick to obtain a corrosion resistance. A cylindrical cathode 2 is coaxially arranged within the anode 1. A cylindrical partition diaphragm 3 for separating a liquid in a cathode chamber from an acidic bath is arranged between said cathode 2 and the anode 1. In addition, similarly a cylindrical partition diaphragm 4 is arranged between said partition diaphragm 3 and the cathode 2. Reference numeral 5 designates a cathode chamber liquid-circulating line and reference numeral 5a designates a vent port of said cathode chamber liquid-circulating line 5. Reference numeral 6 designates a supplied acidic bath-circulating line and reference numeral 6a designates a vent port of said supplied acidic bath-circulating line 6. In addition, reference numeral 7 designates an anode chamber liquid-circulating line and reference numeral 7a designates a vent port of said anode chamber liquid-circulating line 7.

In order to uniformly charge all over the surface of the anode 1, connecting terminals 1a are arranged at 8 points in a circumferential direction of the anode 1 to distribute charges among said connecting terminals 1a. Thus, a local heating by a resistance within the metal of the electrode 1 is avoided and a trouble that a clad layer is separated from an electrode metallic layer at their contact portion is avoided.

Such an electrolyzer was operated for 6 months at a current density of the electrode 1 of 30 A/dm2. After the completion of the operation, the condition of an electrode surface was investigated with the result that no separating phenomenon, which seems to result from an uneven application of charges to said electrode surface, was found.

The cathode 2 is arranged at a position corresponding to the anode 1 and the electrode surface thereof has an outside diameter of 985 mm, a length of 1,000 mm and a thickness of 7 mm. A large number of holes having an inside diameter of 10 mm were uniformly opened in a section of the electrode 2 so that a ratio of a total area of said holes to a total surface area may amount to about 40%. The cathode 2 is provided with four pieces of electrically conductive bars arranged at intervals of 90° in a circumferential direction thereof so that a density of charges supplied may be uniform all over the electrode surface.

When the cylindrical anode 1 and cylindrical cathode 2 having the above described sizes were arranged, a gap between said inner surface of the anode 1 and an outer surface of the cathode 2 was 15 mm and the partition diaphragm 3 and said partition diaphragm 4 were arranged in said gap. As shown in FIG. 1, the respective members were arranged so as to cylindrically construct the partition diaphragm 3 and lines 5, 6, 7 composed of spaces formed by arranging the partition diaphragms 3, 4 were constructed so as to independently supply and discharge the liquid.

The partition diaphragms 3, 4 are made of resins reinforced with fibers with ion exchange functional groups added to give an oxidation resistance, reduce electric resistance and improve a heat resistance. For example "Naphion (trade name)" made by Du Pont and the like are suitably used.

It is not thought that these partition diaphragms 3, 4 are broken by a force applied under the working conditions in respect of strength. However, if the regulation of the respective chambers in pressure is not achieved well by a fluctuation of pressure between the partition diaphragms and the like, the partition diaphragms are stretched to change said spaces independent to each other in volume, whereby it becomes difficult to maintain a stabilized convection time and a stationary flow rate. As to a measure for this, it is thought to protect by means of a nonconductive net structure for suppressing an expansion of the partition diaphragms. However, a problem occurs in that a complicated behavior is observed between the partition diaphragms below an electric field.

Accordingly, the supply of the liquid to the partition chamber is carried out from the lower part of the electrolyzer so that the liquid may flow upward within the electrolyzer. In addition, in order to flow out the liquid uniformly all over the circumference when the liquid is flown out of the electrolyzer, a circumferential overflow wall 5b is provided. Because, in order to discharge a water current with bubbles, which are generated from the anode surface, swallowed up without applying an internal pressure, many problems occur when merely one central discharge port is used and it is necessary to distribute said water current in many directions.

An outlet of the gaseous ingredients separated from the liquid is composed of said vent ports 5a, 6a, 7a in the vicinity of the discharging portion in the upper part of the electrolyzer to suppress the fluctuation of the internal pressure.

The acidic bath was supplied to the anode chamber at a circulating rate of about 20 m3/hr. A flow rate per a sectional area of the anode chamber was 0.1 m/sec. A ratio of a quantity of iron to be removed from the liquid circulated to the electrode surface to that contained in the liquid supplied for removing iron from the liquid circulated to the electrode surface was $10,000/163$ which was judged not to remarkably reduce the concentration of iron on the surfaces of the partition diaphragm by the electrolytic separation and thus have an influence upon the electrophoretic rate.

Figure 2:
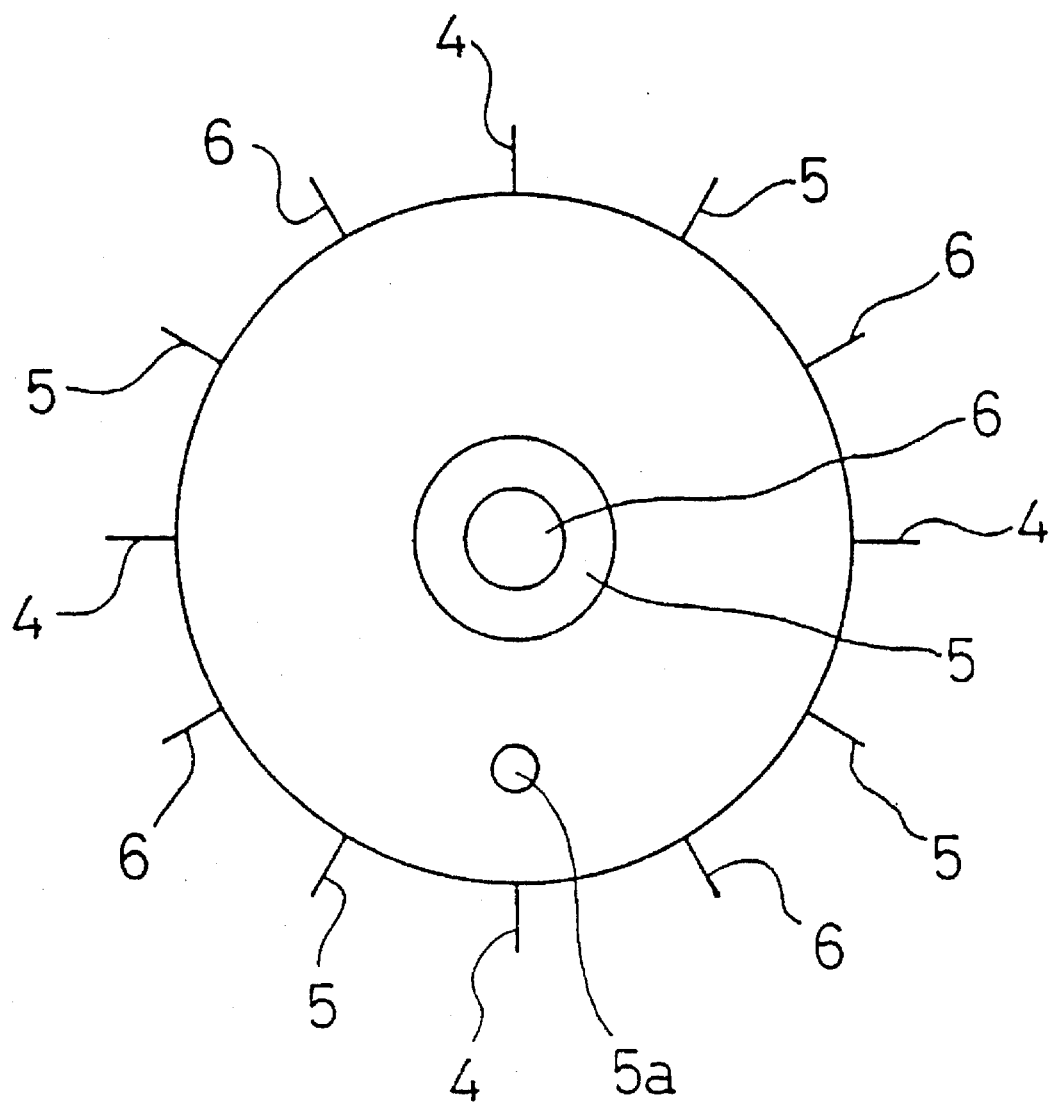
FIG. 2 is a diagram showing a rough construction of said electrolyzer shown in FIG. 1 as seen in a plan view.

FIG. 2 shows a distributed condition of the liquid discharged from the electrolyzer.

A difference in height between an outlet of the liquid discharged from the cathode chamber and an outlet of the liquid discharged from the anode chamber was set at about 15 cm. In addition, as shown in FIG. 1, said outlets of the liquids were separated from outlets of the gases so that no gas may be swallowed up in a flowing-out pipe.

EXAMPLE 2

Figure 3:
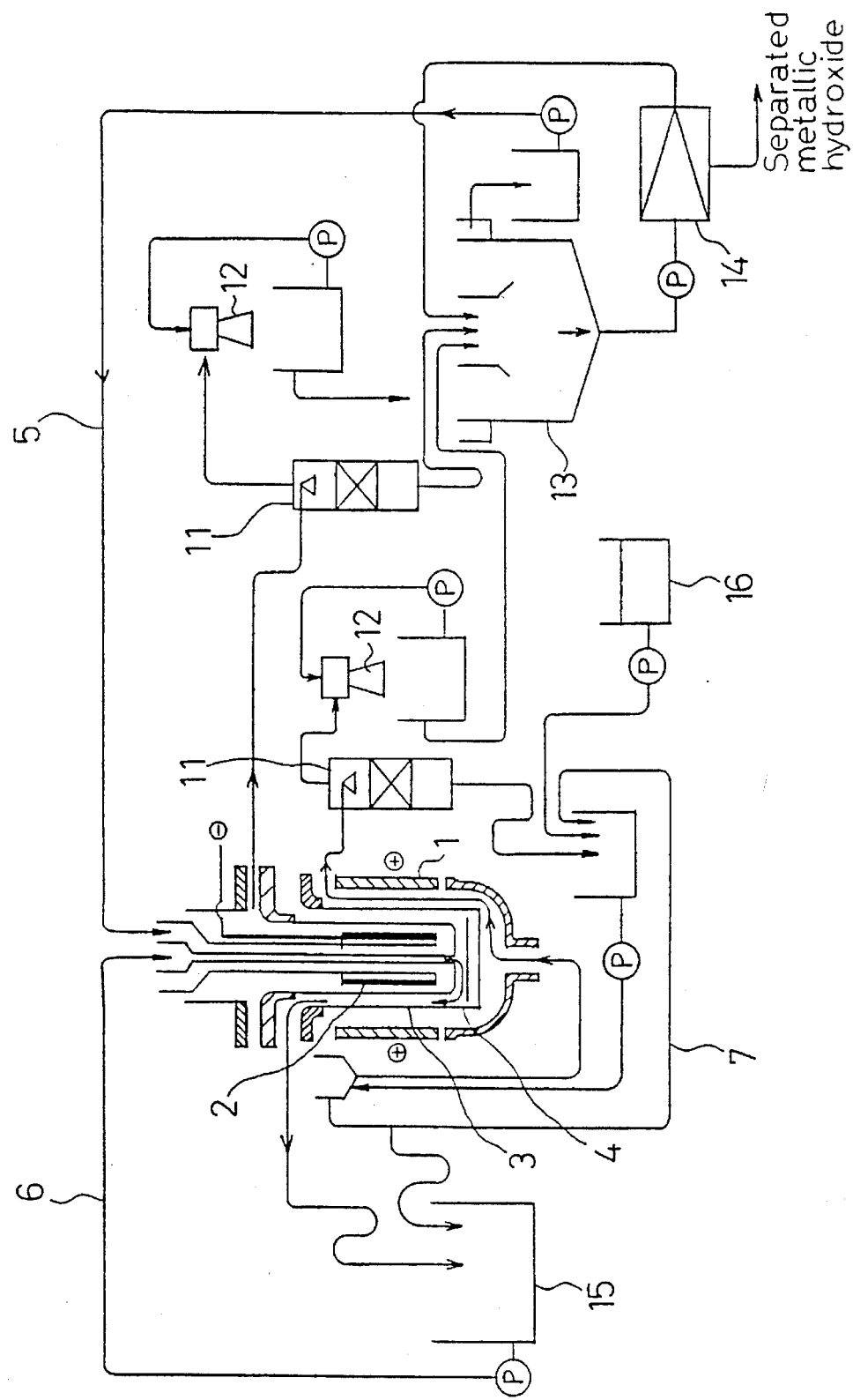
FIG. 3 is a rough diagram showing a treating equipment using the electrolyzer according to the present invention.
Figure 4:
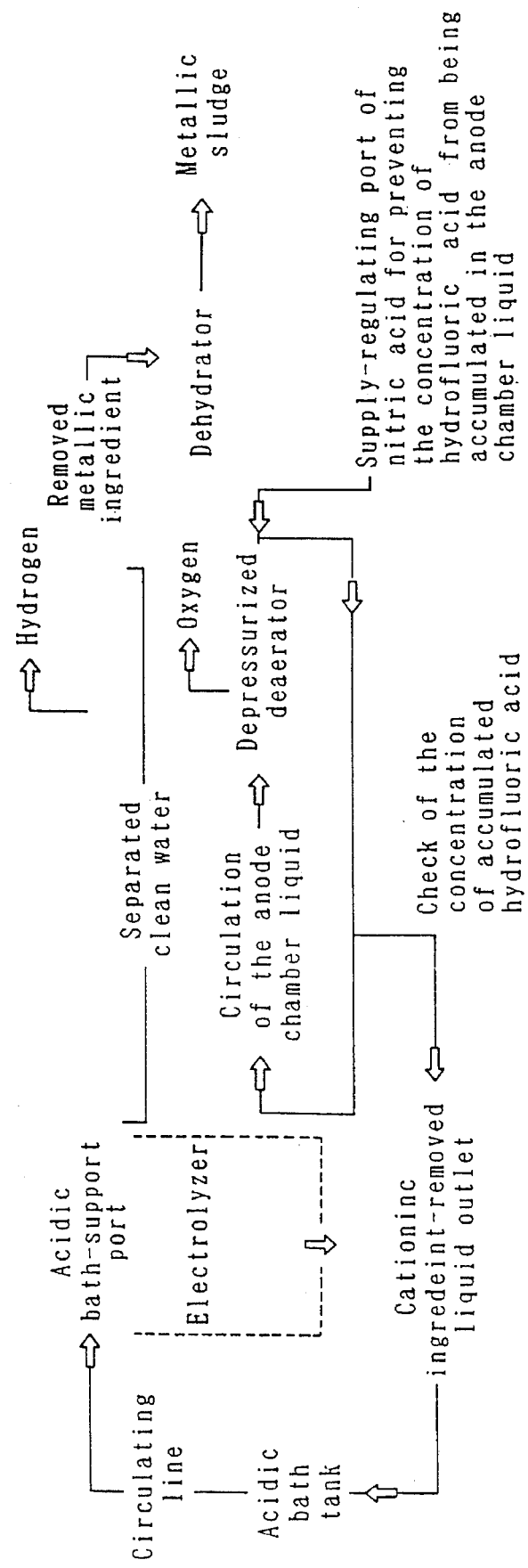
FIG. 4 is a schematic diagram showing said equipment shown in FIG. 3.

In the operation of the electrolyzer shown in EXAMPLE 1, peripheral equipments as shown in FIG. 3 were arranged. In addition, FIG. 4 is a schematic diagram showing said equipments shown in FIG. 3.

Gases generated from the respective electrodes are finely swallowed up in the liquids flown out of both electrode chambers of the electrolyzer and accordingly a problem occurs in that the liquids are circulated in the system as they are. So, the respective liquids discharged from the electrode chambers were supplied to a depressurized deaerating tower 11 to remove fine bubbles so that said bubbles might not stick to the flow wall to form a flow resistance.

An ejector 12 was used as a generator of depressurized condition in this deaeration and an alkaline liquid was circulated in said ejector 12 to generate a negative pressure. In addition, gases taken out of a depressurized chamber were washed with said alkaline liquid to catch the liquids scattered from the respective chambers and at the same time byproduce carbonates.

In the liquid within the cathode chamber, hydroxides and carbonates of the metallic ingredients subjected to the electrophoresis are grown to be accumulated. So, the accumulated hydroxides and carbonates are taken out of the electrode chamber to be introduced into a settling tank 13 through the cathode chamber liquid-circulating line 5 followed by being separated, whereby hydroxides and carbonates can be separated from the circulating system.

Metal compounds separated in said settling tank 13 have a remarkably superior filterability, so that a thick cake can be obtained without adding any auxiliary filter medium in a pneumatic press-type dehydrator 14. The separated cake is put in an electric furnace again to be reused.

The supplied acidic bath-circulating line 6 is provided with an acidic bath tank 15. In addition, the anode chamber liquid-circulating line 7 is supplied with nitric acid from a make-up tank 16.

If the voltage applied was changed in polarity, the bubbles generated from the electrode surfaces were remarkably small-sized, a quantity of the bubbles stuck to the partition diaphragm being reduced, also the liquid being smoothly flown out of the electrolyzer, and the continuous flow being able to obtain.

A method of supplying charges controlled so that a time during when the polarity of the charges supplied was held anodic might be set at 30 to 90 ms and a time during when the polarity was inverted might be set at 10 to 40 ms was selected.

An influence upon the movement of the dissolved ions, which were objects of the electrolytic operation, into the respective chambers was hardly observed and a ratio of the substances moving toward the anode to those moving toward the cathode in concentration was not changed.

EXAMPLE 3

The electrolytic operation was continued by the use of the same electrolyzer and power source as in EXAMPLES 1, 2 with results as shown in Table 1.

separated iron could not be avoided.

It is expected from this that iron can be separated by the sedimentation. On the contrary, the fluoride radicals are accumulated in the form of soluble salt, that is sodium fluoride, but the solubility of sodium fluoride is low, so that it is sufficiently expected that the solubility product or more is reached with the lapse of time, And, in this case, a problem occurs in that crystals are sedimented.

Accordingly, it is required that the cathode chamber liquid, from which the sediments have been separated, is stationarily taken outside and the accumulated ingredients it is understood from this result that the aimed cations are diffused into the cathode chamber in proportion to the quantity of electric current to be removed from the acidic bath tank and the anionic groups bonded with these cations are formed again in the form of free acids to be used for dissolving the metallic ions in the acidic bath tank. Accordingly, this result means that the operation control answering the purpose can be achieved.

In addition, the measurement of the composition of the top after the separation of the sediments from the cathode chamber liquid detected a large quantity of fluoride radicals. It was found from the increasing rate of the fluoride radicals that the movement of 0.53 chemical equivalents of fluoride radical per one chemical equivalent of electrophoretically separated iron could not be avoided.

It is expected from this that iron can be separated by the sedimentation. On the contrary, the fluoride radicals are accumulated in the form of soluble salt, that is sodium fluoride, but the solubility of sodium fluoride is low, so that it is sufficiently expected that the solubility product or more is reached with the lapse of time. And, in this case, a problem occurs in that crystals are sedimented.

Accordingly, it is required that the cathode chamber liquid, from which the sediments have been separated, is removed and the accumulated ingredients are subjected to the electrolytic dialysis again to recover isolated hydrofluoric acid and nitric acid.

It was confirmed that the partition diaphragm used in this

TABLE 1

| Lapse of time | Voltage | Current | Quantity of hydroxides deposited in the cathode chamber (electro-chemical eq/hr) | | | | | | | | |
|---|---|---|---|---|---|---|---|---|---|---|---|
| | | | | | | | Cations | Coordinate anions | | | Ratio of anions |
| (hr) | (Volt) | KA | Fe | Ni | Cr | Ca | in total | F | NO3 | total | to cations |
| 2 | 3.0 | 8.37 | 85 | 10 | 6 | 0.01 | 101 | 43 | 1.2 | 44.2 | 0.437 |
| 3 | 2.8 | 8.37 | 87 | 10 | 7 | 0.02 | 104 | 45 | 1.0 | 46.0 | 0.442 |
| 4 | 2.8 | 8.37 | 86 | 11 | 8 | 0.01 | 105 | 42 | 1.2 | 43.2 | 0.411 |

It is understood from this result that the aimed cations are diffused into the cathode chamber in proportion to the quantity of electric current to be removed from the acidic bath tank and the anionic groups bonded with these cations are formed again in the form of free acids to be used for dissolving the metallic ions in the acidic bath tank. Accordingly, this result means that the operation control answering the purpose can be achieved.

In addition, the measurement of the composition of the top after the separation of the sediments from the cathode chamber liquid detected a large quantity of fluoride radicals. It was found from the increasing rate of the fluoride radicals that the movement of 0.53 chemical equivalents of fluoride radical per one chemical equivalent of electrophoretically electrolytic operation was endurable to the long-term use and its electric resistance characteristics and selective separation characteristics for cations could be maintained for a long time.

EXAMPLE 4

When acid bath liquid containing a fluoride or fluorides is treated by the electrolyzer, fluoric ions in coordination bond with iron ions inevitably move into the cathode compartment, wherein the equivalent ratio of iron ions to fluoric ions is known to be 1:0.4 to 1:0.6 in terms of electrochemical equivalent. In the cathode compartment, these fluoric ions act upon alkaline components existing in the cathode compartment and are converted into soluble sodium fluoride, which is accumulated in the cathode compartment to such an extend that the concentration of the sodium fluoride in the liquid in the cathode compartment exceeds the solubility. The result is that a tacky precipitate forms, which soon collects on the ion exchange membrane defining the cathode compartment and causes a decline in the electrical conductivity of the ion exchange membrane to such an extent that supply voltage has to be increased in order to continue the electrophoresis at constant current.

EXAMPLE 4 deals with a measure to be taken to cope with the foregoing. This measure consists in taking a portion of the liquid out of the cathode compartment of a first electrolyzer before the tacky precipitate collects on the ion exchange membrane 3 and feeding this portion of the liquid into the compartment defined by two ion exchange membranes 3 and 4 in a second electrolyzer.

Figure 5:
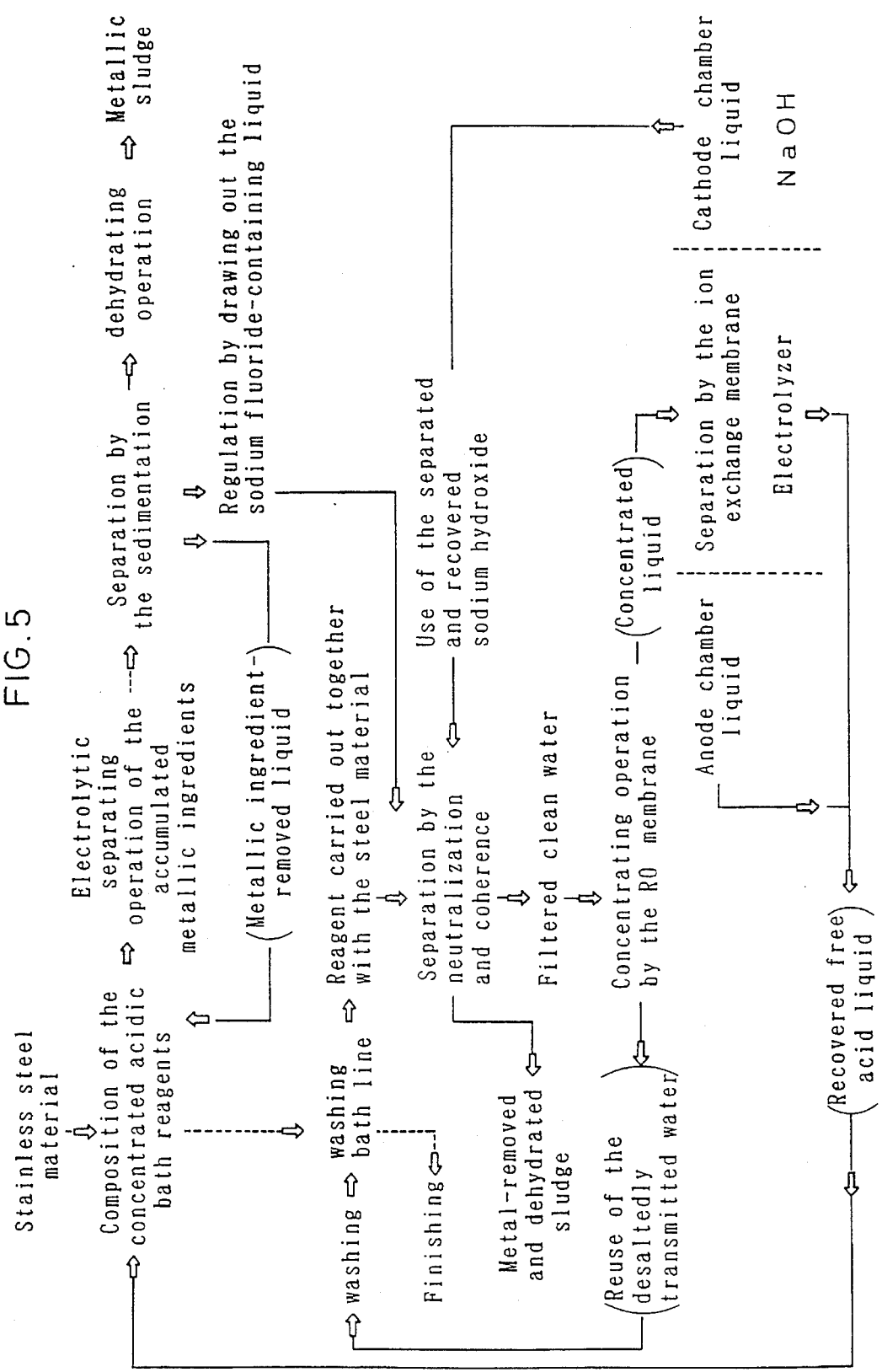
FIG. 5 is a flow chart showing a method of recoverying constituent reagents of a bath on the basis of the present invention.
Figure 6:
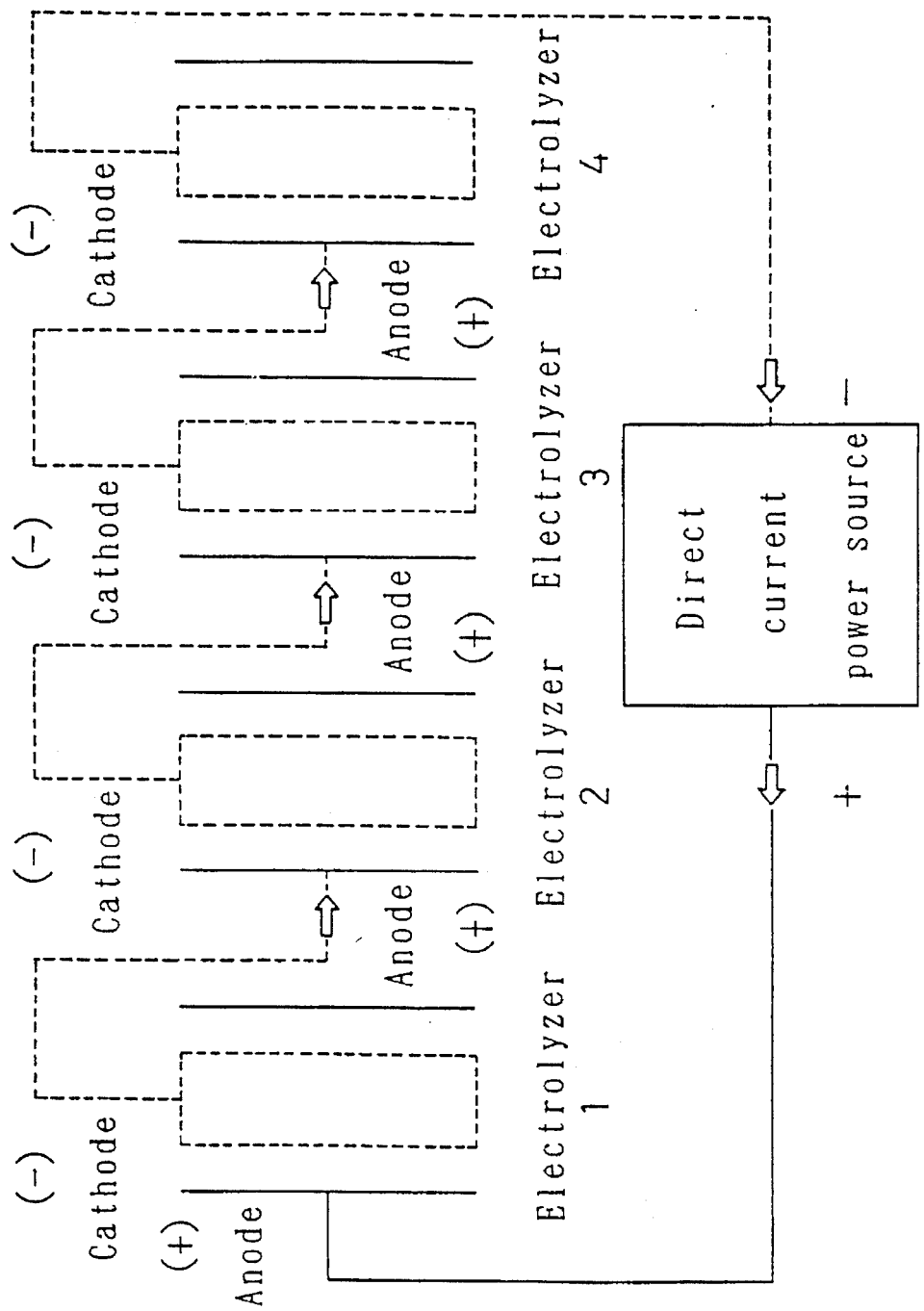
FIG. 6 is a rough diagram showing another treating equipment using the electrolyzer according to the present invention.

As shown in FIG. 5, this discharged liquid was used as an alkaline neutralizing agent for neutralizing the cathode chamber liquid separated in the second stage electrolyzer. And, coexisting iron was separated as the sediments and the separated liquid was filtered to remove dispersed iron corpuscles. The filtrate was supplied to the reverse osmotic apparatus to obtain the quality of desalted water of 25 µS. This desalted water was reused for washing steel materials.

The concentrated liquid contains sodium fluoride and sodium nitrate but this concentrated liquid was subjected to the electrolytic separation in the second stage electrolyzer together with the cathode chamber liquid of the above described concentrated liquid.

The second stage electrolyzer comprises an anode chamber isolated by a composite-type cation-selectively transmitting ion exchange membrane and a cathode chamber isolated by an anion-selectively transmitting ion exchange membrane so that a liquid to be separated may be supplied between said anode chamber and said cathode chamber. An electrode material is same as in the first electrolyzer and acids can be recovered by the similar operation.

The second electrolyzer is different from the first electrolyzer in that a partition diaphragm of the anode chamber is formed of said anion-selectively transmitting ion exchange membrane and thus the dissociative distribution of neutral salts is improved.

The operating conditions under such construction are shown in Table 2.

EXAMPLE 5

An electrolyzer for removing iron increasing at a rate of 150 eq/hr from a solution containing remaining free nitric acid in a quantity of 31 g/ and dissolved iron in a quantity of 10 g/ [dissolved in the form of Fe(NO3)] has been planned on the basis of the electrolyzer having the construction described in the above described EXAMPLE and operating in the same manner as in the above described EXAMPLE. As a result, it was found that if it was intended to burden one electrolyzer with this removing capacity, an electric capacity of about 9,000 A/hr was required. It was found that an electrode surface area of about 300 dm2 was required in order to supply this electric capacity (provided that a current density was 30 A/dm2). In the electrolyzer to this end, an electrode plate having a diameter of 950 mm and a length of 1,000 mm is required for the anode. In addition, a voltage of about 3.5 volts is required but in fact about 5.6 volts are required due to a factor that it is difficult to stabilize the voltage by influences of a flow of bubbles and the like in the continuous operation. Accordingly, it was judged that the capacity of 54 kW was required for the power source equipment.

So, as shown in FIG. 5, an electrode plate having a diameter of 500 mm, a length of 500 mm and an electrode surface area of 78.5 dm2 was used as the anode. Four electrolyzers capable of passing an electric current of 2,355 A/hr therethrough were arranged in series and cathode terminals and anode terminals of the respective electrolyzers were connected one after another and both ends were connected with the power source to start the electrolytic operation.

The liquid to be supplied to the respective electrolyzers was supplied in parallel from one supply head port. In addition, also the circulating liquid to be supplied to the respective electrode chambers was supplied similarly and a temperature of the respective liquids was set at 60° C. As a result, the electric current supplied was 2,300 A. In addition, it was confirmed that the supply voltage of about 2.5 Volts was required for one electrolyzer and then four electrolyzers were arranged in series to start the operation. Accordingly, in order to maintain the supply electric current of 2,300 A, the supply voltage of about 6 Volts was required. As a result, it was found that the capacity of the power source of 13.5 kW was sufficient by reducing the electrode surface areas of the electrolyzers and arranging the electrolyzers in series.

In addition, the fluctuation of the electric current during

TABLE 2

| Lapse of time | Chamber 1 Anode chamber | | Composite-type cation exchange membrane | | | | | | Cationic exchange membrane 3 Cathode chamber | | |
| --- | --- | --- | --- | --- | --- | --- | --- | --- | --- | --- | --- |
| | | | Inlet side | | Supply chamber 2 Circulating outlet side | | | | | | |
| | HNO3 | HF | NaF | NAno3 | HF | HNO3 | NaF | NaNO3 | NaOH | NaF | NaNO3 |
| 0 | 2.0N | <.001 | 2.0N | 0.8N | 1.5 | 0.7 | 0.4 | 0.1 | 2.5 | <0.01N | <0.001 |
| 10 | 2.2N | <.01 | 1.4 | 0.7 | 1.2 | 0.6 | 0.2 | 0.1 | 3.6 | 0.02 | <0.001 |
| 20 | 2.2 | <.01 | 2.0 | 0.8 | 1.7 | 0.7 | 0.2 | 0.1 | 3.5 | 0.02 | <0.001 | the operation of the electrolyzers was recorded with the result that the fluctuation was hardly observed. It was confirmed that the slight fluctuation, which was observed according to circumstances, resulted from merely the change of electric current proportional to the conductivity of the liquid on the basis of the change of composition of the liquid with the lapse of the operation, a great change within a short time and a phenomenon, such as a temporary interception, being not observed, and also measured signals being stabilized and flat.

As above described, if four electrolyzers were used, the current-supplying capacity of the power source was reduced to ¼ times that in case of one electrolyzer and the power consumption was reduced to ¼ times that in case of one electrolyzer, that is 13.5 kw/54 kw=¼. That is to say, in particular in the case where the power source was large-sized, the direct operating expenses for the same work was reduced to ¼ times because in general the contracted fixed electric power expenses were different depending upon the electric power consumed by the power source. In addition, it was found also in respect of other problems that it was advantageous to arrange small-sized electrolyzers in parallel.

EXAMPLE 6

Comparing the quantity of electric current supplied to the electrolyzer during the operation with the consumption of electric current found by calculating from the quantity of the aimed ions electrophoretically moved into the cathode, it is found that the quantity of electric current consumed for the aimed work is generally less and this indicates a reduced efficiency in the electrolytic operation.

It was found that the current efficiency was about 44% and the remaining electric power of 56% was consumed by the electrolysis of water molecules on the electrode surface under the operating conditions in the above described EXAMPLE 5. Considering oppositely, this means that water molecules are electrolyzed in a rate of 3,330 g/hr to be carried out of the system. If in fact the liquid of 10 m3 was put in the electrolyzer according to EXAMPLE 4 to continuously operate for 24 hours, the liquid level was lowered by about 150 L. The loss by the electrolysis can not be avoided as one reason of this. In addition, a fact that the aimed substances are electrophoretically moved in the electrolyzer and thus the current efficiency is reduced, whereby the lowering of the liquid level is increased for the same one operating time is observed.

Accordingly, according to the present invention, as shown in FIG. 2, the gases depressurizedly deaerated from the circulating liquid to enter both electrode chambers of the electrolyzer are released into air to obtain the similar effect as in the case where the liquid circulated into the electrolyzer is subjected to the concentrating operation. In addition, oxygen acts upon hydrogen to form water again, whereby being discharged, by passing these gases from both the cathode and the anode through laminated layers of granular activated carbon. If the discharged gases are cooled, water can be obtained and if this water is returned to the respective liquid chambers, the liquid is not concentrated. In order to concentrate the acidic liquid having a remarkably strong oxidizing power, a large-scaled apparatus is generally required but the evaporating operation can be suitably controlled without any special heating and evaporating operation in the electrolytic operation described here.

EXAMPLE 7

As described in EXAMPLE 5, if the liquids supplied in the respective isolated chambers have a poor conductivity in the electrolytic operation, the aimed electric current can not be supplied at the aimed voltage and in order to maintain the constant electric current, the supply voltage is increased and thus the operating electric power expenses are increased. Accordingly, the aimed conditions can not be satisfied unless the liquids supplied in the respective chambers are balanced in conductivity. Consequently, in order to conduct the series operation and maintain a still lower electric power, it becomes necessary to watch the fluctuation of the liquids supplied in the respective chambers in quality in addition to the prevention of the formation of the insulating layer resulting from the gases generated on the electrode surfaces.

Accordingly, as shown in FIG. 7, the samples are periodically sent to the analytical apparatus from the respective liquid-supplying lines with changing the sampling position and the condition of the liquid to be supplied is maintained constant depending upon the informations obtained by the analytical apparatus comprising the acid analyzer. In addition, in order to obtain advantageous informations, the conductivity meter is used together. In this analyzer, the simultaneously aimed informations for concentrated acids, alkaline ingredients and metallic ingredients can be obtained by merely changing titrating agents depending upon the object. As to titrating solution used, sodium hydroxide is suitable for the quantitative determination of acids and metallic ingredients, sulfuric acid being used for the quantitative determination of sodium carbonate, and an absolute value by the conductivity meter being utilized for the quantitative determination of sodium nitrate.

Concretely speaking, the anode chamber liquid is an about 2 N-aqueous solution of nitric acid while the cathode chamber liquid is a mixture solution of an about 0.5N-aqueous solution of sodium carbonate and a 2N-aqueous solution of sodium nitrate. The informations are obtained by sampling from these circulating liquids and simultaneously measuring by the use of both the temperature titration and the conductivity titration. And, the analytical values determined by analyzing the obtained informations are shown in Table 3.

TABLE 3

| Lapse of time | Anode chamber liquid Free acid | Concentration of cathode chamber liquid | | Concentration of supply liquid | |
| --- | --- | --- | --- | --- | --- |
| | | Free acid | Metal (iron) | Sodium carbonate | Sodium nitrate |
| 0 hr | 2.1N | 0.5N | 0.5N | 0.5N | 1.0N |
| 10 hr | 2.3 | 0.55 | 0.45 | 0.45 | 1.0 |
| 20 hr | 2.1 | 0.6 | 0.40 | 0.48 | 1.1 |
| 30 hr | 2.3 | 0.5 | 0.5 | 0.50 | 1.0 |
| 40 hr | 2.1 | 0.6 | 0.4 | 0.55 | 1.2 |

In addition, the liquid to be supplied in order to remove iron is similarly analyzed. The removal of iron becomes clear by that the concentration of iron in the bath tank is not increased.

What is claimed is:

1. An electrolyzer for treating an object liquid comprising:

a cylindrical anode plate formed as an outer wall and having an inner surface processed with metal, such as platinum, for improved corrosion resistance;

a cylindrical cathode plate coaxially arranged at a position close to said inner surface of said anode plate;

two ion exchange membranes coaxially arranged between said anode and cathode plates standing oppositely for functioning as electrically conductive partition diaphragms to control selectivities of ions electrophoretically passing therethrough, one of said two ion exchange membranes being disposed in proximity to said anode plate so as to define an anode chamber, the other of said two ion exchange membranes being disposed in proximity to said cathode plate so as to define a cathode chamber;

means for feeding acidic liquid into said anode chamber;

means for feeding alkaline liquid into said cathode chamber;

means for feeding a solution to be treated into a chamber defined by said two ion exchange membranes;

each of said chambers being provided with a flange at a discharge side so as to allow each of said liquids and said solution to flow uniformly omnidirectionally towards an outer edge of said flange; and said two ion exchange membranes being formed of composite cationic permeable membranes in order to suppress an electrophoretical movement of anions from said chamber defined by said two ion exchange membranes to said anode chamber so that the anode chamber can be protected in the case where anions apt to corrode an anode material are contained in said solution to be treated.

* * * * *